United States Patent [19]
Preece

[11] 3,818,585
[45] June 25, 1974

[54] METHOD OF MANUFACTURING YOKE ASSEMBLIES

[75] Inventor: Kenneth Preece, Solihull, England

[73] Assignee: Joseph Lucas (Electrical) Limited, Birmingham, England

[22] Filed: Dec. 29, 1972

[21] Appl. No.: 319,720

[30] Foreign Application Priority Data
Jan. 8, 1972    Great Britain.................... 943/72

[52] U.S. Cl..................... 29/596, 29/598, 310/42, 310/154, 310/216, 310/254
[51] Int. Cl. ........................................... H02k 15/14
[58] Field of Search ........ 29/596, 598, 602; 310/42, 310/216, 218, 154, 156, 254, 258, 259

[56] References Cited
UNITED STATES PATENTS
2,890,357   6/1959   Clark, Jr. .......................... 310/258
3,156,838   11/1964  Winther ............................. 310/42
3,597,644   8/1971   Preece ........................... 310/218 X Primary Examiner—Charles W. Lanham
Assistant Examiner—Carl E. Hall
Attorney, Agent, or Firm—Holman & Stern

[57] ABSTRACT

A method of manufacturing a yoke assembly for an electric motor and/or dynamo electric machine in which a series of spaced notches are formed in at least one of the edges, preferably in opposed edges, of a metal plate. Depressions are then formed separately in the metal plate so as to extend from each notch to the opposite edge of the plate. The metal plate is then rolled into a tube and a field winding is inserted into the tube around the poles which are defined by the depressions.

8 Claims, 5 Drawing Figures

PATENTED JUN 25 1974 3,818,585

METHOD OF MANUFACTURING YOKE ASSEMBLIES

This invention relates to methods of manufacturing yoke assemblies for electric motors and/or dynamo electric machines.

According to the present invention there is provided a method of manufacturing a yoke assembly, comprising the steps of cutting a series of spaced notches in at least one of the edges of a metal plate, displacing material out of the plane of the metal plate so as to form a depression which extends from each notch to the opposite edge of the plate, said displacement being effected separately for each depression, forming the metal plate into a tube with the depressions projecting inwardly to define poles, and inserting a field winding into the tube around the poles.

Most advantageously, the notches are spaced alternately in opposed edges of the plate.

Preferably, a slipper of configurated metal plate is inserted into each pole. The tube and field winding assembly may be pressed into an outer sleeve or may have end cups pressed onto the ends thereof.

Figure 5:
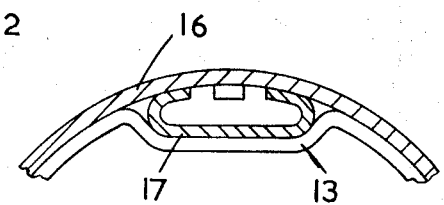

An embodiment of the present invention will now be described, by way of example, with reference to FIGS. 1 to 5 of the accompanying drawing in which:

FIGS. 1 to 4 show various stages in a method of manufacturing a yoke assembly according to the present invention, and FIG. 5 shows an alternative form of slipper arrangement in a yoke assembly of the present invention.

Referring to FIGS. 1 to 4, the method of manufacturing a yoke assembly comprises cutting a series of alternately spaced notches 2 in opposed edges of a rectangular metal plate 1. In this embodiment, two notches 2 are formed in each longitudinal edge of the plate 1 (see FIG. 1).

Figure 1:
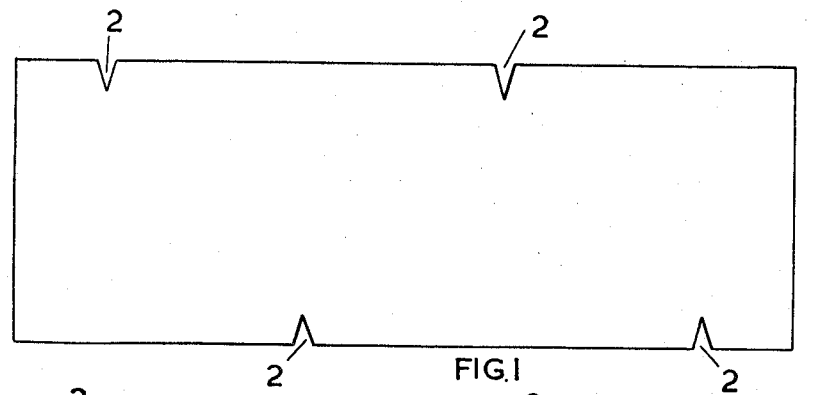
Figure 2:
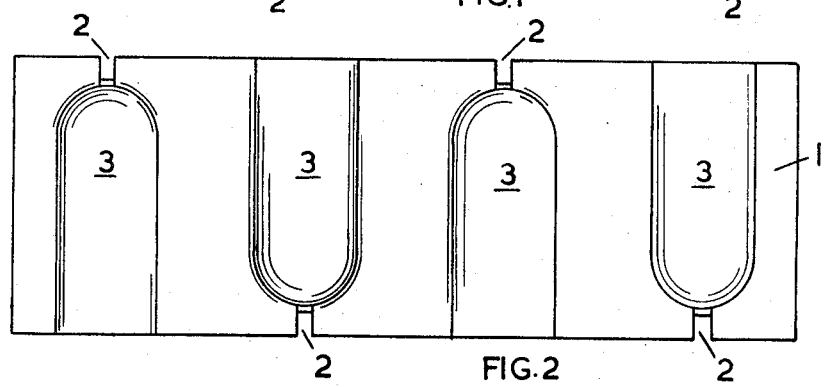
Figure 3:
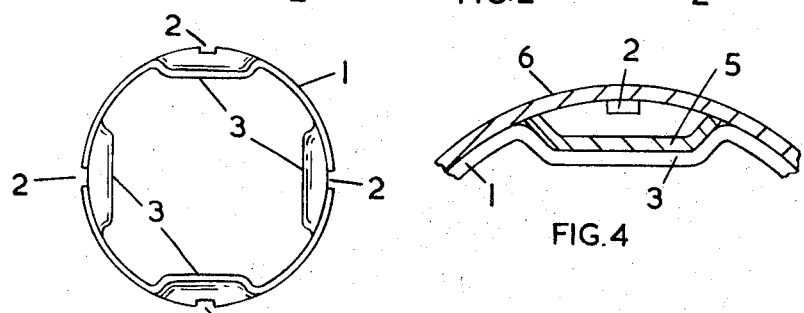
Figure 4:
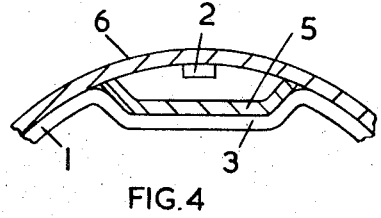

Then, material is deformed out of the plane of the metal plate by a pressing operation so as to form depressions 3, each of which depressions 3 extends from a notch 2 to the opposite longitudinal edge of the metal plate 1. Each depression 3 is formed by a separate pressing operation. During the pressing operation, the notches 2 which were originally substantially 'V'-shaped become deformed as shown in FIG. 2 due to longitudinal "pull-in" along the length of the plate 1. Without the notches 2, undue thinning of the plate around the depressions 3 would occur.

The metal plate 1 is then wrapped to form a tube which is welded to form a cylindrical tube. A wave-wound winding (not shown), of known type that is to say a winding with axially extending portions joined by curved end portions, is inserted into the tube and expanded so as to surround the poles which are formed within the tube by the projection 3. Slippers 5 (see FIG. 4) are inserted into the poles on the external faces of the depressions 3. Finally, the assembly is pressed into an outer sleeve 6 to produce the yoke assembly. Alternatively, end cups (not shown) can be pressed onto the tube to produce the yoke assembly instead of the sleeve 6.

It will be noted that the ends of the slippers 5 abut against the outer sleeve 6 and thereby enhance the magnetic field properties of the assembly.

Referring now to FIG. 5 the yoke assembly illustrated therein is formed in the same way as that described above except that an alternative slipper arrangement is employed. In this embodiment slippers 17 are each substantially C-shaped and are "sprung" into the spaces defined between an outer sleeve 16 and depressions 13. In this manner, a positive contact between the slippers 17 and the sleeve 16 is ensured.

In an alternative embodiment (not shown), the slippers are formed integrally with the sleeve 6 or 16 by producing indentations in the latter.

The present invention provides a simple and convenient method of manufacturing a yoke assembly.

I claim:

1. A method of manufacturing a yoke assembly, comprising the steps of cutting a series of spaced notches having a first shape in at least one of the edges of a metal plate, displacing material out of the plane of the metal plate so as to form a plurality of depressions each of which extends from a respective one of said notches to the opposite edge of the plate, said displacement being effected separately for each depression and also causing said notches to assume a second shape, the change in notch shape being effective to prevent undue thinning of the plate during displacement thereof, forming the metal plate into a tube with the depressions projecting inwardly to define poles, and inserting a field winding into the tube around the poles.

2. The method according to claim 1, wherein the notches are spaced alternately in opposed edges of the plate.

3. The method according to claim 1, including the step of inserting a slipper of configurated metal plate into each pole.

4. The method according to claim 1, including the step of pressing the tube and field winding assembly into an outer sleeve.

5. The method according to claim 4, including the step of inserting into spaces between the outer sleeve and each depression a slipper of substantially C-shaped cross-section.

6. The method according to claim 1, including the step of pressing end cups onto the ends of the tube and field winding assembly.

7. The method according to claim 3, including the step of pressing the tube and field winding assembly into an outer sleeve.

8. The method according to claim 7, including the step of forming indentations in the outer sleeve to produce a slipper at each pole.

* * * * *